(12) United States Patent
Gong

(10) Patent No.: US 11,940,853 B2
(45) Date of Patent: Mar. 26, 2024

(54) SCREW-FREE FIXING AND CLAMPING DEVICE FOR COMPUTER MOTHERBOARD

(71) Applicant: Guangdong Baiyun University, Guangzhou (CN)

(72) Inventor: Jianhu Gong, Guangdong (CN)

(73) Assignee: Guangdong Baiyun University, Guangzhou (CN)

( * ) Notice: Subject to any disclaimer, the term of this patent is extended or adjusted under 35 U.S.C. 154(b) by 222 days.

(21) Appl. No.: 17/590,386

(22) Filed: Feb. 1, 2022

(65) Prior Publication Data
US 2022/0365575 A1 Nov. 17, 2022

(30) Foreign Application Priority Data
May 14, 2021 (CN) .......................... 202110530029.0

(51) Int. Cl.
*G06F 1/18* (2006.01)
(52) U.S. Cl.
CPC ................................... *G06F 1/184* (2013.01)
(58) Field of Classification Search
CPC ...................................................... G06F 1/184
See application file for complete search history.

(56) References Cited

U.S. PATENT DOCUMENTS

| 7,130,187 | B1 * | 10/2006 | Sun ......................... G06F 1/187 248/560 |
| 2004/0095733 | A1 * | 5/2004 | Cheng ...................... G06F 1/184 361/759 |
| 2007/0014085 | A1 * | 1/2007 | Meserth .................. G06F 1/184 |

FOREIGN PATENT DOCUMENTS

| CN | 200420007470 | U | 4/2005 |
| CN | 107422811 | A * | 12/2017 ............. G06F 1/181 |
| CN | 20750312 | U | 6/2018 |
| CN | 113110713 | A * | 7/2021 |

* cited by examiner

*Primary Examiner* — Daniel J Rohrhoff
(74) *Attorney, Agent, or Firm* — Notaro, Michalos & Zaccaria P.C.

(57) ABSTRACT

A screw-free device for a computer motherboard that relates to the technical field of computer-aided hardware is disclosed. The device also includes a first fixing plate, where the first fixing plate is fixedly connected with a second fixing plate through a damping spring, the side walls of a first supporting door frame and a second supporting door frame are embedded with dustproof filter screens, a clamping outer frame is bonded with a first soft cushion block, a sliding supporting block is rotatably connected with a fastening screw, a fixed supporting block and the sliding supporting block are both fixedly connected with a fastening pressure plate through a fastening spring, the fastening pressure plate is bonded with a second soft cushion block, and the supporting frame is embedded with a heat-dissipating fan and a heat-dissipating filter screen, respectively.

8 Claims, 5 Drawing Sheets

SCREW-FREE FIXING AND CLAMPING DEVICE FOR COMPUTER MOTHERBOARD

CROSS REFERENCE TO RELATED APPLICATION(S)

This patent application claims the benefit and priority of Chinese Patent Application No. 202110530029.0, filed on May 14, 2021, the disclosure of which is incorporated by reference herein in its entirety as part of the present application.

TECHNICAL FIELD

The present disclosure belongs to the technical field of computer-aided hardware, in particular to a screw-free fixing and clamping device for a computer motherboard.

BACKGROUND ART

A computer motherboard plays a vital role in the whole computer system, also known as a motherboard. The computer motherboard is one of the most basic and important parts of the computer. Usually, the computer motherboard is fixed in the computer mainboard by screws, but it is very inconvenient to fix the computer motherboard by screws in the process of installation and disassembly. At the same time, the screw holes for fixing the computer motherboard easily slide, so that the computer motherboard is loosened easily, which is inconvenient during actual use.

The published document 200420007470.2 is a screw-free fixing device for computer clamping devices, and discloses a screw-free fixing device for computer clamping devices, which comprises a fixing frame which is fixedly installed on the inner side of the back panel of the hardware mainframe of the computer case and consists of one or several fixing members. Each fixing member is pivoted with a push switch, the fixing member is provided with a first positioning block which can position the push switch pivoted with the fixing member, and the push switch is provided with a second positioning block which can position the stopper of computer clamping devices. The screw-free fixing and clamping device for a computer mainboard changes the traditional screw rotary fixing mode into the fixing mode of pressing and fastening by a push switch. At the same time, the screw-free fixing device for case clamping devices can be a molding die, which can greatly improve the production efficiency and reduce the working intensity of workers. However, it is difficult for the screw-free fixing and clamping device for a computer mainboard to fix computer mainboards of different sizes and models. At the same time, it is difficult for the screw-free fixing and clamping device for a computer mainboard to have the functions of heat dissipation and dust prevention. The computer mainboard is prone to heat and dust adhesion during actual use.

The published literature CN20750312U is a fixing device for a computer motherboard, and discloses a fixing device for a computer motherboard, which comprises a fixing cover plate, a fixing frame, a case connecting plate, a load-bearing plate and a motherboard. The fixing frame is internally connected with the left side of a fixing block, the left side of the fixing block is clamped in the fixing frame, the right side of the fixing block is connected with the left side of the load-bearing plate, the right side of the fixing block is clamped in the load-bearing plate, the left side of the fixing frame is connected with a screw fixing sleeve through a fixing screw, the screw fixing sleeve is embedded in the fixing frame, the fixing screw is connected with the fixing block, the fixing screw passes through the screw fixing sleeve, the fixing frame is inserted into the fixing block, the left side of the fixing frame is connected with a left connecting sleeve through a rotating shaft, the left connecting sleeve rotates on the rotating shaft, the right side of the left connecting sleeve is connected with the left side of the fixing cover plate, the left side of the fixing cover plate is inserted into the left connecting sleeve, the right side of the fixing cover plate is connected with the left side of a right connecting sleeve, the right side of the fixing cover plate is inserted into the right connecting sleeve, and the fixing cover plate is made of steel wire mesh. The fixing device for a computer motherboard effectively prevents the motherboard from being separated from the fixing frame, facilitates the replacement of the motherboard, and has a certain heat dissipation effect. However, the fixing device for a computer motherboard has a poor shock absorption effect. When the computer mainframe topples, the internal computer motherboard is also greatly impacted, which easily leads to the damage of the computer motherboard.

Therefore, there are still the following disadvantages during actual use.
1. The existing fixing device for a computer mainboard generally has the problem that it is difficult to fix computer mainboards of different sizes and models.
2. The existing fixing device for a computer mainboard generally has the problem of poor heat dissipation and dust prevention effects on a computer mainboard.
3. The existing fixing device for a computer mainboard generally has the problem of a poor shock absorption effect and easy damage to computer mainboards when the computer mainframe topples.

Therefore, the existing fixing device for a computer mainboard cannot meet the needs during actual use, so that there is an urgent need for an improved technology in the market to solve the above problems.

SUMMARY

The purpose of the present disclosure is to provide a screw-free fixing and clamping device for a computer mainboard, which is convenient to fix computer mainboards of different sizes and models by providing a clamping outer frame, a first soft cushion block, a fastening screw, a fastening spring, a fastening pressure plate, a second soft cushion block, a first supporting door frame, a second supporting door frame, a dustproof filter screen, a heat-dissipating filter screen, a heat-dissipating fan, a damping spring, a first soft cushion block, a fastening screw, a fastening spring, a fastening pressure plate and a second soft cushion block. The dustproof filter screen, the heat-dissipating filter screen and the heat-dissipating fan have the functions of dust prevention and heat dissipation on the computer mainboard. The damping spring can have the function of buffering when the computer mainboard topples, which can effectively prevent the computer mainboard from being damaged when the computer mainboard topples, and solve the problems that the existing fixing device for a computer mainboard is generally difficult to fix computer mainboards of different sizes and models, has poor heat dissipation, dust prevention shock absorption effects on a computer mainboard, and easily leads to the damage of the computer motherboard when the computer mainframe topples.

To solve the above technical problems, the present disclosure is realized by the following technical scheme.

The present disclosure provides a screw-free fixing and clamping device for a computer motherboard, comprising a first fixing plate, wherein the upper side wall of the first fixing plate is fixedly connected with the lower side wall of a second fixing plate through a damping spring, the cross sections of the first fixing plate and the second fixing plate are provided in a rectangular structure, a first supporting door frame and a second supporting door frame are provided in a first sliding groove of the side wall of the second fixing plate, the side walls of the first supporting door frame and the second supporting door frame are embedded with dust-proof filter screens, the upper side wall of the second fixing plate is fixedly connected with a fixed supporting block, the second sliding groove of the upper side wall of the second fixing plate is slidably connected with a sliding supporting block, the upper side walls of the fixed supporting block and the sliding supporting block are both fixedly connected with a clamping outer frame, the inner side wall of the clamping outer frame is bonded with a first soft cushion block, the cross sections of the clamping outer frame and the first soft cushion block are both provided in a U-shaped structure, the sliding supporting block is rotatably connected with the left end of a fastening screw, there are two fastening screws in total, the side walls of the fixed supporting block and the sliding supporting block are both fixedly connected with the side wall of a fastening pressure plate through a fastening spring, the side wall of the fastening pressure plate is bonded with a second soft cushion block, the side wall of the second soft cushion block is provided with anti-skid lines, a supporting frame is fixedly connected in a through slot of the upper side wall of the second fixing plate, a heat-dissipating fan is embedded in the side wall of the supporting frame, and a heat-dissipating filter screen is embedded in the through slot of the upper side wall of the second fixing plate.

Further, the side wall of the upper end of the second supporting door frame is fixedly connected with a magnetic suction plate, and there are two first supporting door frames and two second supporting door frames. The cross sections of the parts where the first supporting door frame and the second supporting door frame are connected with the first sliding groove are provided in a T-shaped structure, and the upper end of the second supporting door frame is provided with a bump for fixing the magnetic suction plate.

Further, the first supporting door frame is fixedly connected in the first sliding groove, and the second supporting door frame is slidably connected with the first sliding groove. The first supporting door frame is fixedly connected to the left side wall of the first sliding groove and the right side wall of the first sliding groove, respectively.

Further, the fastening screw is riveted with the threaded hole of a long limit block, and the right end of the fastening screw is fixedly connected with a rotating handle. The long limiting block is fixedly connected with the upper side wall of the second fixing plate, and the cross section of the left end of the fastening screw is provided in a T-shaped structure.

Further, the first sliding groove is provided on the front side wall of the second fixing plate and the rear side wall of the second fixing plate, respectively, and the cross section of the first sliding groove is provided in a T-shaped structure.

Further, the second sliding groove is provided on the upper side wall of the second fixing plate, the cross section of the lower end of the sliding supporting block is provided in a T-shaped structure, and the cross section of the second sliding groove is provided in a T-shaped structure.

Further, the lower end of the damping spring is fixedly connected with the upper side wall of the first fixing plate, and the upper end of the damping spring is fixedly connected with the lower side wall of the second fixing plate. There are four damping springs in total, and the fastening springs are symmetrically provided with respect to the first fixing plate.

Further, there are four fastening springs in total, the fastening springs are symmetrically provided with respect to the first supporting door frame, the fastening springs are symmetrically provided with respect to the second supporting door frame, and the cross section of the fastening pressure plate is provided in an L-shaped structure.

The present disclosure has the following beneficial effects.

1. According to the present disclosure, the clamping outer frame, the first soft cushion block, the fastening screw, the fastening spring, the fastening pressure plate and the second soft cushion block are provided. When the computer motherboard is installed, the computer motherboard is clamped in the first soft cushion block in the clamping outer frame on the upper side of the fixed supporting block. The first soft cushion block squeezes and fixes the computer motherboard, and then the fastening screw is rotated by the rotating handle. The fastening screw further drives the sliding supporting block to move. The first soft cushion block in the clamping outer frame on the upper side of the sliding supporting block squeezes and fixes the other end of the computer motherboard. Finally, the fastening spring drives the second soft cushion block on the side wall of the fastening pressure plate to squeeze and fix the front and back sides of the computer motherboard, so that the computer motherboard can be firmly fixed, and at the same time, the computer motherboards of different sizes and models can be fixed. The problem that the existing fixing device for a computer motherboard is generally difficult to fix computer motherboards of different sizes and models is solved.

2. According to the present disclosure, the first supporting door frame, the second supporting door frame, the dustproof filter screen, the heat-dissipating filter screen and the heat-dissipating fan are provided. The second supporting door frame can slide to both sides without affecting the replacement of the computer motherboard. When the second supporting door frame moves to both sides, the dustproof filter screen is folded, which is convenient to operate. The dustproof filter screen can reduce the dust accumulated on the computer motherboard, and the heat-dissipating filter screen can have the functions of heat dissipation and dust prevention at the same time. The heat-dissipating fan can improve the heat dissipation efficiency of the computer mainboard, and is beneficial to make the computer mainboard work normally, solving the problem that the existing fixing device for a computer mainboard generally has poor heat dissipation and dust prevention effects on the computer mainboard.

3. According to the present disclosure, the damping spring is provided. The damping spring can have the function of buffering when the computer mainboard topples. The damping spring can absorb part of the impact force, which can effectively prevent the internal computer mainboard from being greatly impacted when the computer mainboard topples and thus causing the computer mainboard to be damaged, solving the problems that the existing fixing device for a computer mainboard generally has a poor shock absorption effect and easily leads to the damage of the computer motherboard when the computer mainframe topples.

Of course, it is not necessary for any product implementing the present disclosure to achieve all the advantages mentioned above at the same time.

BRIEF DESCRIPTION OF THE DRAWINGS

In order to explain the technical scheme of the embodiments of the present disclosure more clearly, the drawings that need to be used in the description of the embodiments will be briefly introduced hereinafter. Obviously, the drawings in the following description are only some embodiments of the present disclosure. For those skilled in the art, other drawings can be obtained according to these drawings without creative efforts.

Figure 1:
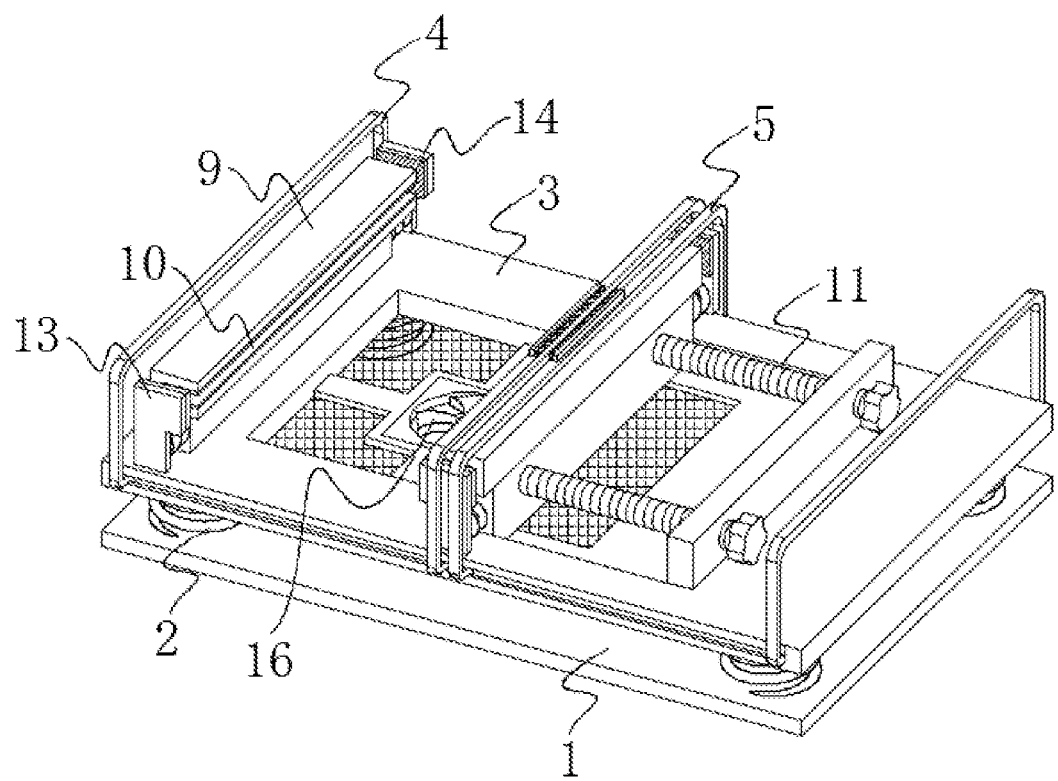
FIG. 1 is a schematic structural diagram of the present disclosure.

In the figures, the list of parts represented by each reference number is as follows.

1. First fixing plate; 2. Damping spring; 3. Second fixing plate; 301. First sliding groove; 302. Second sliding groove; 4. First supporting door frame; 5. Second supporting door frame; 6. Dustproof filter screen; 7. Fixed supporting block; 8. Sliding supporting block; 9. Clamping outer frame; 10. First soft cushion block; 11. Fastening screw; 12. Fastening spring; 13. Fastening pressure plate; 14. Second soft cushion block; 15. Supporting frame; 16. Heat-dissipating fan; 17. Heat-dissipating filter screen; 18. Magnetic suction plate; 19. Long limit block; 20. Rotating handle.

DETAILED DESCRIPTION OF THE EMBODIMENTS

The technical scheme in the embodiment of the present disclosure will be clearly and completely described with reference to the drawings in the embodiment of the present disclosure hereinafter.

Referring to FIGS. 1-9, the present disclosure discloses a screw-free fixing and clamping device for a computer mainboard, which comprises a first fixing plate 1. The upper side wall of the first fixing plate 1 is fixedly connected with the lower side wall of a second fixing plate 3 through a damping spring 2. A first supporting door frame 4 and a second supporting door frame 5 are provided in a first sliding groove 301 of the side wall of the second fixing plate 3. The side walls of the first supporting door frame 4 and the second supporting door frame 5 are embedded with dustproof filter screens 6. The dustproof filter screen 6 is woven of nylon material. The upper side wall of the second fixing plate 3 is fixedly connected with a fixed supporting block 7. The second sliding groove 302 of the upper side wall of the second fixing plate 3 is slidably connected with a sliding supporting block 8. The upper side walls of the fixed supporting block 7 and the sliding supporting block 8 are both fixedly connected with a clamping outer frame 9. The inner side wall of the clamping outer frame 9 is bonded with a first soft cushion block 10. The first soft cushion block 10 is made of rubber material. The sliding supporting block 8 is rotatably connected with the left end of a fastening screw 11. The side walls of the fixed supporting block 7 and the sliding supporting block 8 are both fixedly connected with the side wall of a fastening pressure plate 13 through a fastening spring 12. The side wall of the fastening pressure plate 13 is bonded with a second soft cushion block 14. The second soft cushion block 14 is made of rubber material. A supporting frame 15 is fixedly connected in a through slot of the upper side wall of the second fixing plate 3. A heat-dissipating fan 16 is embedded in the side wall of the supporting frame 15, and a heat-dissipating filter screen 17 is embedded in the through slot of the upper side wall of the second fixing plate 3. The heat-dissipating filter screen 17 is made of metal material. When the computer motherboard is installed, the computer motherboard is clamped in the first soft cushion block 10 in the clamping outer frame 9 on the upper side of the fixed supporting block 7. The first soft cushion block 10 squeezes and fixes the computer motherboard, and then the fastening screw 11 is rotated by the rotating handle 20. The fastening screw 11 further drives the sliding supporting block 8 to move. The first soft cushion block 10 in the clamping outer frame 9 on the upper side of the sliding supporting block 8 squeezes and fixes the other end of the computer motherboard. Finally, the fastening spring 12 drives the second soft cushion block 14 on the side wall of the fastening pressure plate 13 to squeeze and fix the front and back sides of the computer motherboard, so that the computer motherboard can be firmly fixed, and at the same time, the computer motherboards of different sizes and models can be fixed. The damping spring 2 can have the function of buffering when the computer mainboard topples. The damping spring 2 can absorb part of the impact force, which can effectively prevent the internal computer mainboard from being greatly impacted when the computer mainboard topples and thus causing the computer mainboard to be damaged. The two second supporting door frames 5 are moved from both sides to the middle. The magnetic suction plates 18 on the upper side of the second supporting door frames 5 are mutually attracted. The two second supporting door frames 5 are fixed together, so that the dustproof filter screen 6 covers the upper side of the computer motherboard. The dustproof filter screen 6 can have the function of dust prevention for the computer motherboard. The heat-dissipating filter screen 17 can have the function of heat dissipation, and at the same time, can have a certain dust prevention effect. The heat-dissipating fan 16 can improve the heat dissipation efficiency of the computer motherboard.

Figure 2:
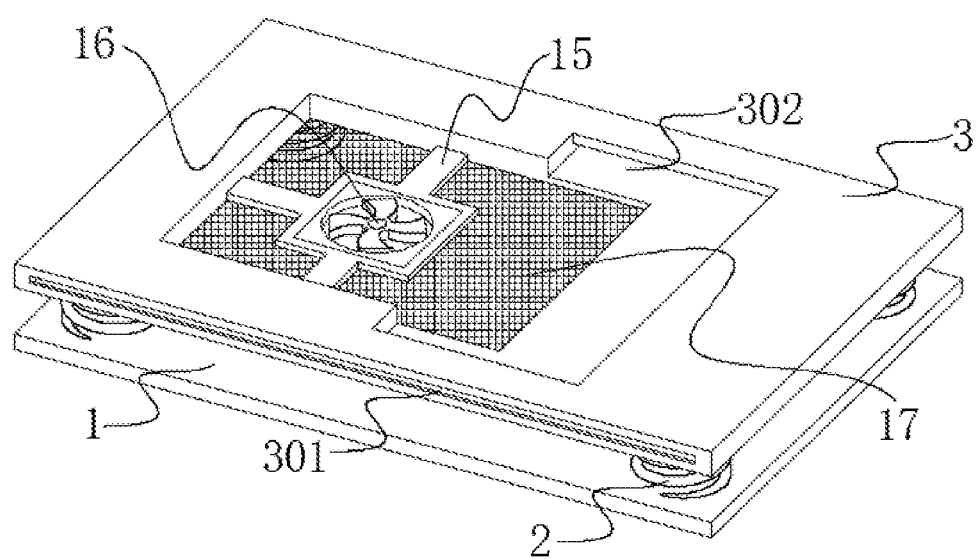
FIG. 2 is a schematic diagram of the connection of a second fixing plate according to the present disclosure.

As shown in FIGS. 1 and 2, the first supporting door frame 4 is fixedly connected in the first sliding groove 301, and the second supporting door frame 5 is slidably connected with the first sliding groove 301. The first supporting door frame 4 is fixedly connected to the left side wall of the first sliding groove 301 and the right side wall of the first sliding groove 301, respectively. When the second supporting door frame 5 moves to both sides, the dustproof filter screen 6 can be folded.

Figure 6:
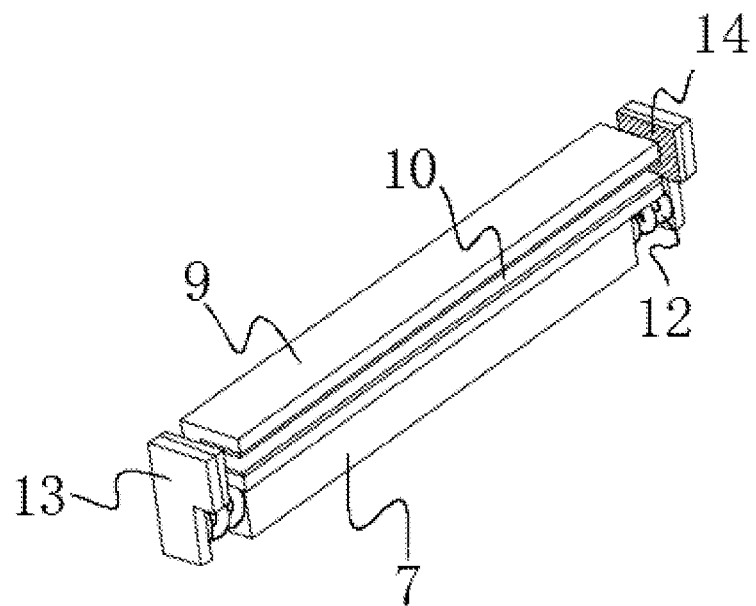
FIG. 6 is a schematic diagram of the connection of a fixed supporting block according to the present disclosure.
Figure 8:
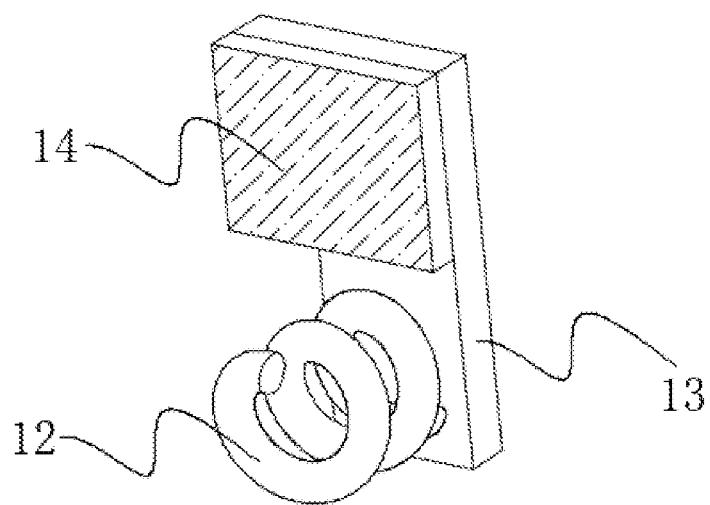
FIG. 8 is a schematic diagram of the connection of a fastening pressure plate according to the present disclosure.
Figure 9:
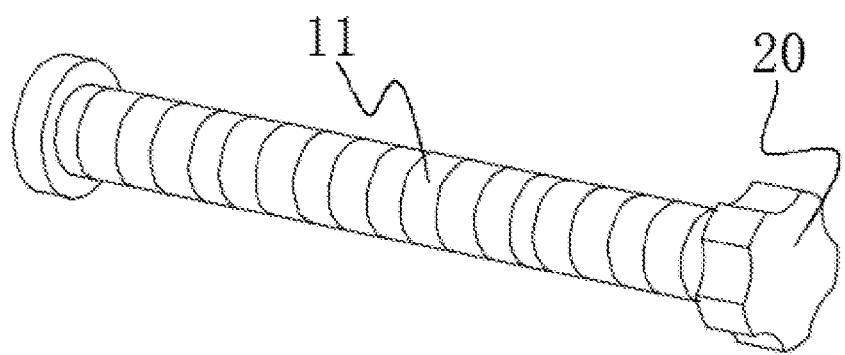
FIG. 9 is a schematic diagram of the connection of a fastening screw according to the present disclosure.

As shown in FIGS. 1, 6 and 8, there are four fastening springs 12 in total, and the cross section of the fastening pressure plate 13 is provided in an L-shaped structure. The fastening springs 12 drive the fastening pressure plate 13 to be pulled from the front and back sides to the middle, so that the second soft cushion block 14 can squeeze and fix the computer motherboard.

As shown in FIG. 2, the first sliding groove 301 is provided on the front side wall of the second fixing plate 3 and the rear side wall of the second fixing plate 3, respectively, and the cross section of the first sliding groove 301 is provided in a T-shaped structure. The lower end of the damping spring 2 is fixedly connected with the upper side wall of the first fixing plate 1, and the upper end of the damping spring 2 is fixedly connected with the lower side wall of the second fixing plate 3. The first fixing plate 1 is fixedly connected to the inner side wall of the computer mainboard in a manner of gluing or screw fixing, and the damping spring 2 has the function of shock absorption and buffering.

Figure 7:
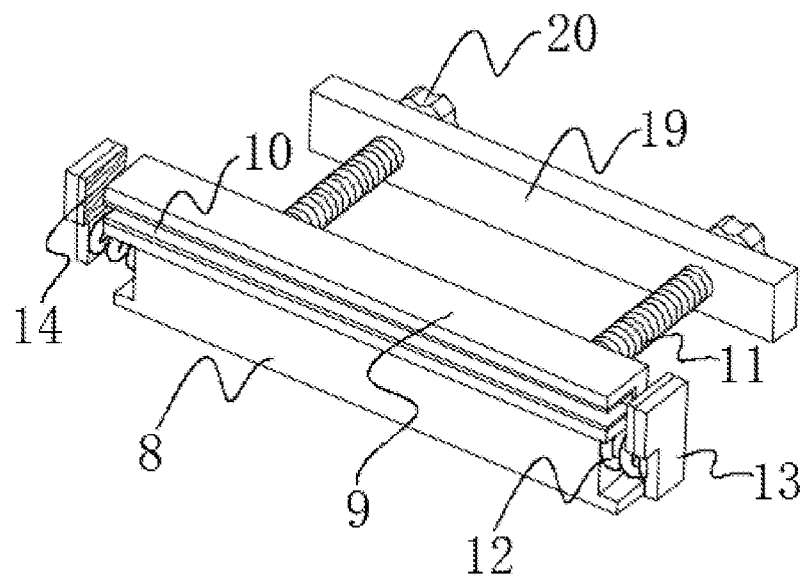
FIG. 7 is a schematic diagram of the connection of a sliding supporting block according to the present disclosure.

As shown in FIGS. 2 and 7, the second sliding groove 302 is provided on the upper side wall of the second fixing plate 3, and the cross section of the lower end of the sliding supporting block 8 is provided in a T-shaped structure. The sliding supporting block 8 slides along the second sliding groove 302, so that the first soft cushion block 10 in the clamping outer frame 9 of the upper side of the sliding supporting block 8 can squeeze and fix the other end of the computer motherboard.

Figure 3:
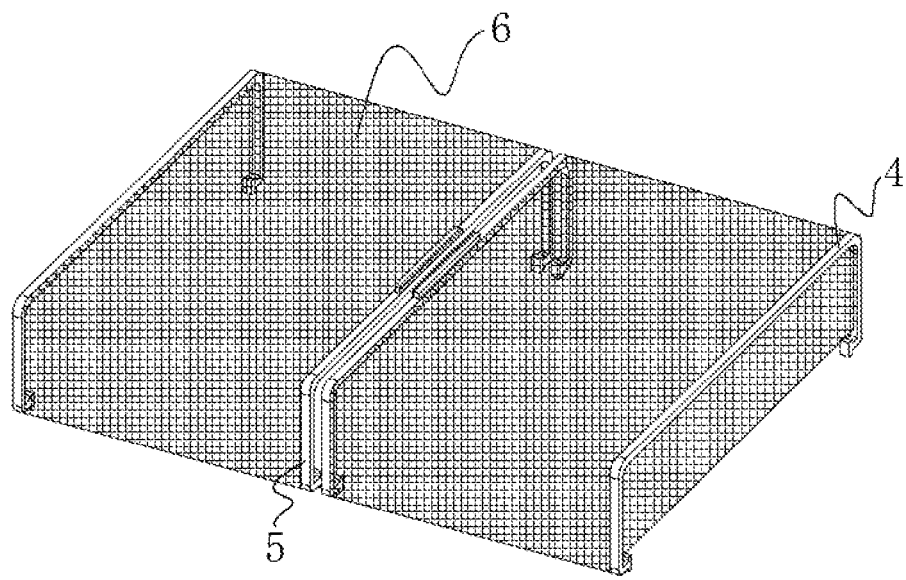
FIG. 3 is a schematic diagram of the connection of a first supporting door frame and a second supporting door frame according to the present disclosure.
Figure 4:
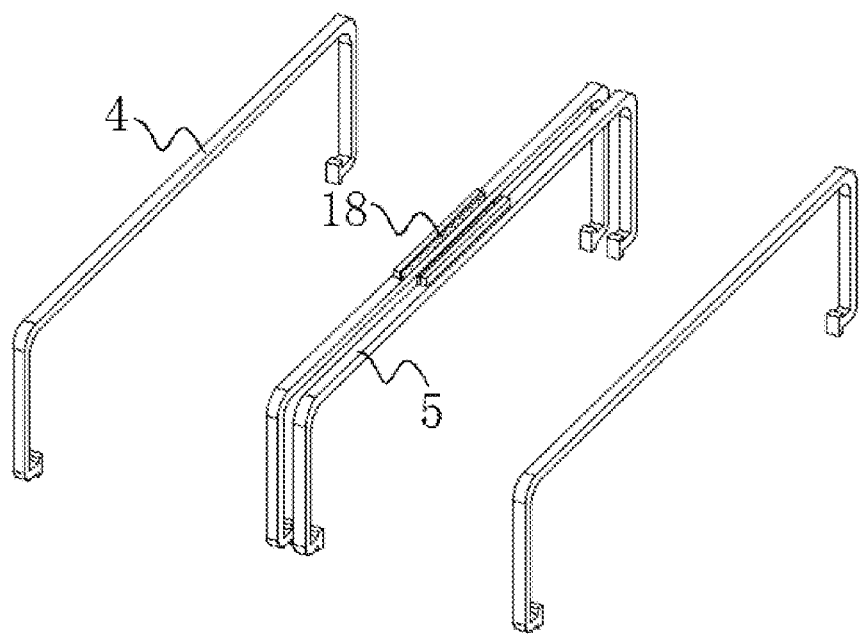
FIG. 4 is a partial structural schematic diagram of FIG. 3 of the present disclosure.
Figure 5:
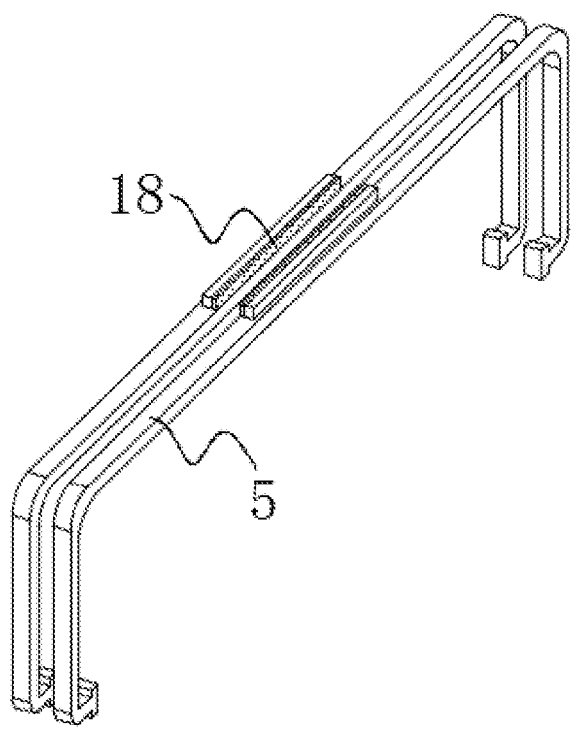
FIG. 5 is a schematic diagram of the connection of a second supporting door frame and a magnetic suction block according to the present disclosure.

As shown in FIGS. 3, 4 and 5, the side wall of the upper end of the second supporting door frame 5 is fixedly connected with a magnetic suction plate 18, and there are two first supporting door frames 4 and two second supporting door frames 5. The two second supporting door frames 5 are moved from both sides to the middle. The magnetic suction plates 18 on the upper side of the second supporting door frames 5 are mutually attracted. The two second supporting door frames 5 are fixed together, so that the dustproof filter screen 6 covers the upper side of the computer motherboard.

As shown in FIG. 7, the fastening screw 11 is riveted with the threaded hole of a long limit block 19, and the right end of the fastening screw 11 is fixedly connected with a rotating handle 20. The fastening screw 11 is rotated by the rotating handle 20, so that the position of the sliding supporting block 8 is further adjusted, and the first soft cushion block 10 in the clamping outer frame 9 of the upper side of the sliding supporting block 8 squeezes and fixes the other end of the computer motherboard.

A specific application of the embodiment is as follows. Step 1, when the computer motherboard is installed, the computer motherboard is clamped in the first soft cushion block 10 in the clamping outer frame 9 on the upper side of the fixed supporting block 7. The first soft cushion block 10 squeezes and fixes the computer motherboard, and then the fastening screw 11 is rotated by the rotating handle 20. The fastening screw 11 further drives the sliding supporting block 8 to move. The first soft cushion block 10 in the clamping outer frame 9 on the upper side of the sliding supporting block 8 squeezes and fixes the other end of the computer motherboard.

Step 2, the fastening spring 12 drives the second soft cushion block 14 on the side wall of the fastening pressure plate 13 to squeeze and fix the front and back sides of the computer motherboard, so that the computer motherboard can be firmly fixed, and at the same time, the computer motherboards of different sizes and models can be fixed.

Step 3, the two second supporting door frames 5 are moved from both sides to the middle. The magnetic suction plates 18 on the upper side of the second supporting door frames 5 are mutually attracted. The two second supporting door frames 5 are fixed together, so that the dustproof filter screen 6 covers the upper side of the computer motherboard. The dustproof filter screen 6 can have the function of dust prevention for the computer motherboard.

Step 4, the heat-dissipating filter screen 17 can have the function of heat dissipation, and at the same time, can have a certain dust prevention effect. The heat-dissipating fan 16 can improve the heat dissipation efficiency of the computer motherboard. The heat-dissipating fan 16 can dissipate the heat generated by the computer motherboard.

Step 5, the damping spring 2 can have the function of buffering when the computer mainboard topples. The damping spring 2 can absorb part of the impact force, which can effectively prevent the computer mainboard in the computer mainframe from being damaged.

The above is only the preferred embodiment of the present disclosure, and does not limit the present disclosure. Any modification to the technical schemes described in the previous embodiments, equivalent replacement of some technical features, any modification, equivalent replacement and improvement fall within the scope of protection of the present disclosure.

What is claimed is:

1. A screw-free fixing and clamping device for a computer motherboard, comprising a first fixing plate (1), wherein the upper side wall of the first fixing plate (1) is fixedly connected with the lower side wall of a second fixing plate (3) through a damping spring (2), a first supporting door frame (4) and a second supporting door frame (5) are provided in a first sliding groove (301) of the side wall of the second fixing plate (3), the side walls of the first supporting door frame (4) and the second supporting door frame (5) are embedded with dustproof filter screens (6), the upper side wall of the second fixing plate (3) is fixedly connected with a fixed supporting block (7), the second sliding groove (302) of the upper side wall of the second fixing plate (3) is slidably connected with a sliding supporting block (8), the upper side walls of the fixed supporting block (7) and the sliding supporting block (8) are both fixedly connected with a clamping outer frame (9), the inner side wall of the clamping outer frame (9) is bonded with a first soft cushion block (10), the sliding supporting block (8) is rotatably connected with the left end of a fastening screw (11), the side walls of the fixed supporting block (7) and the sliding supporting block (8) are both fixedly connected with the side wall of a fastening pressure plate (13) through a fastening spring (12), the side wall of the fastening pressure plate (13) is bonded with a second soft cushion block (14), a supporting frame (15) is fixedly connected in a through slot of the upper side wall of the second fixing plate (3), a heat-dissipating fan (16) is embedded in the side wall of the supporting frame (15), and a heat-dissipating filter screen (17) is embedded in the through slot of the upper side wall of the second fixing plate (3).

2. The screw-free fixing and clamping device for a computer mainboard according to claim 1, wherein the side wall of the upper end of the second supporting door frame (5) is fixedly connected with a magnetic suction plate (18), and there are two first supporting door frames (4) and two second supporting door frames (5).

3. The screw-free fixing and clamping device for a computer mainboard according to claim 1, wherein the first supporting door frame (4) is fixedly connected in the first sliding groove (301), and the second supporting door frame (5) is slidably connected with the first sliding groove (301).

4. The screw-free fixing and clamping device for a computer mainboard according to claim 1, wherein the fastening screw (11) is riveted with the threaded hole of a long limit block (19), and the right end of the fastening screw (11) is fixedly connected with a rotating handle (20).

5. The screw-free fixing and clamping device for a computer mainboard according to claim 1, wherein the first sliding groove (301) is provided on the front side wall of the second fixing plate (3) and the rear side wall of the second fixing plate (3), respectively, and the cross section of the first sliding groove (301) is provided in a T-shaped structure.

6. The screw-free fixing and clamping device for a computer mainboard according to claim 1, wherein the second sliding groove (302) is provided on the upper side wall of the second fixing plate (3), and the cross section of the lower end of the sliding supporting block (8) is provided in a T-shaped structure.

7. The screw-free fixing and clamping device for a computer mainboard according to claim 1, wherein the lower end of the damping spring (2) is fixedly connected with the upper side wall of the first fixing plate (1), and the upper end of the damping spring (2) is fixedly connected with the lower side wall of the second fixing plate (3).

8. The screw-free fixing and clamping device for a computer mainboard according to claim 1, wherein there are four fastening springs (12) in total, and the cross section of the fastening pressure plate (13) is provided in an L-shaped structure.

\* \* \* \* \*